May 31, 1927.  
J. H. TUDOR  
1,630,986  
ILLUMINATING DEVICE FOR VEHICLES  
Filed Sept. 8, 1923    2 Sheets-Sheet 1
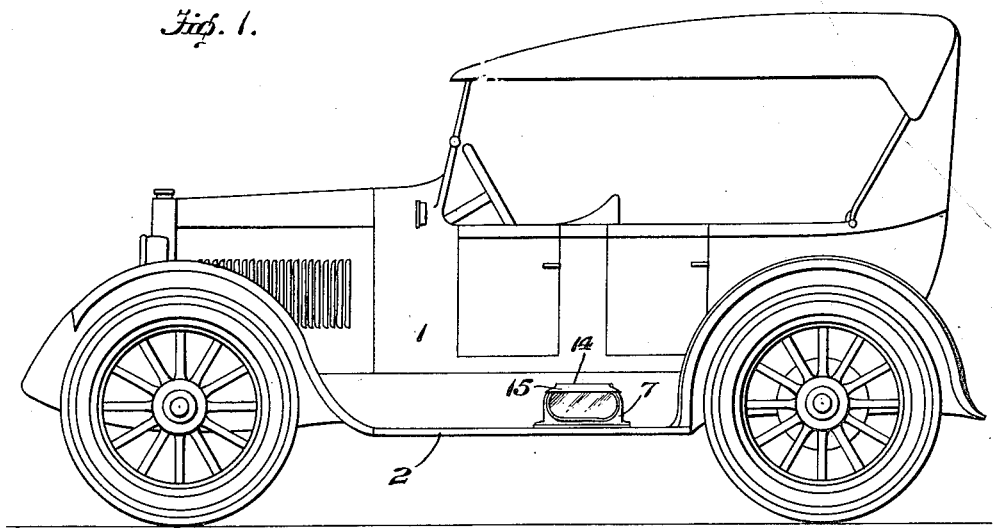
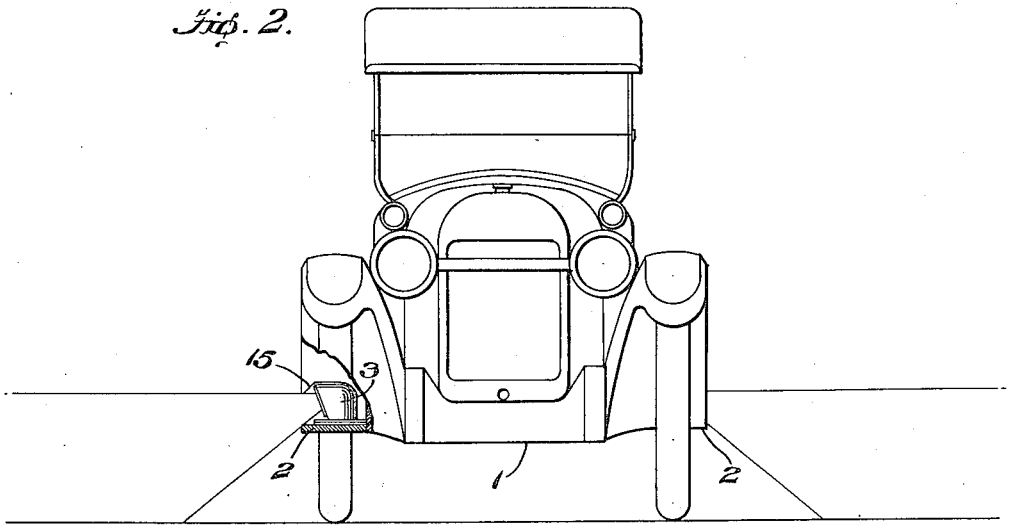
Inventor  
James H. Tudor  
By Norman E. Hodges  
his Attorney May 31, 1927.
J. H. TUDOR
1,630,986
ILLUMINATING DEVICE FOR VEHICLES
Filed Sept. 8, 1923  2 Sheets-Sheet 2
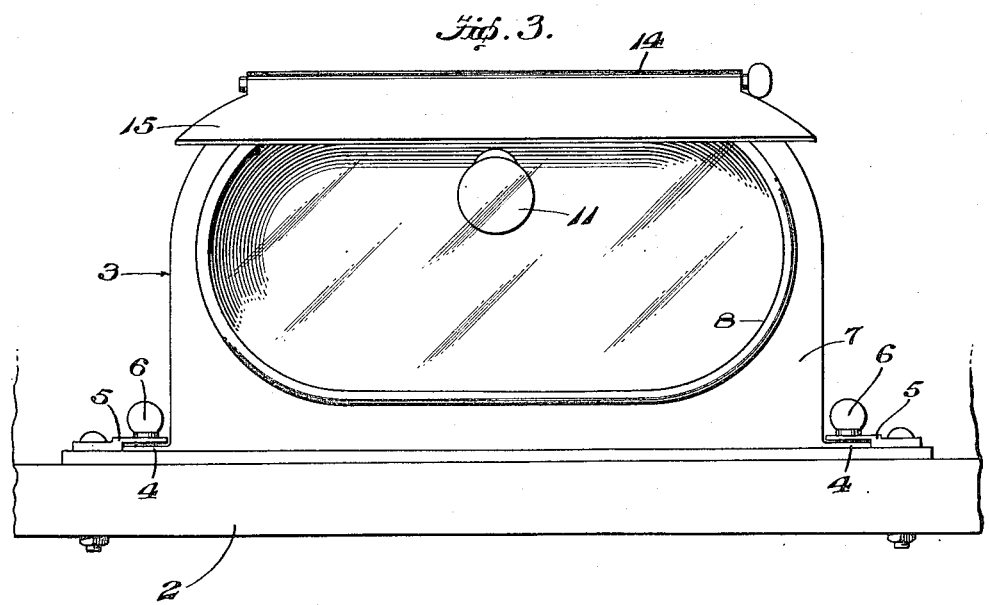
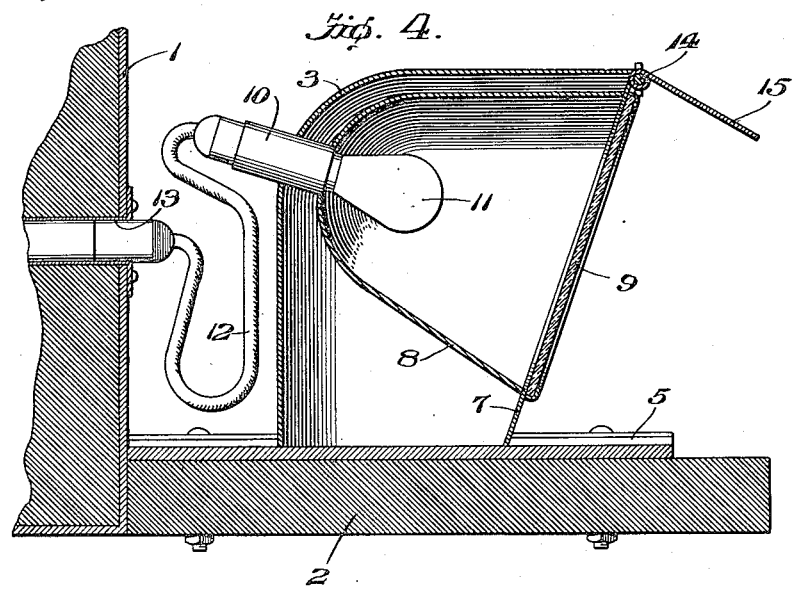
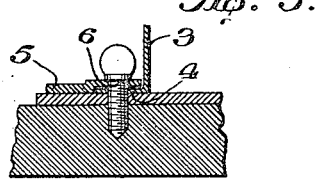

Patented May 31, 1927.

1,630,986

UNITED STATES PATENT OFFICE.

JAMES H. TUDOR, OF CINCINNATI, OHIO.

ILLUMINATING DEVICE FOR VEHICLES.

Application filed September 8, 1923. Serial No. 661,629.

This invention relates to illuminating devices for vehicles and more particularly to devices for illuminating the road, on either side of the car effecting a white way safety zone, or a light space parallel with the side of the car, and a corresponding dark streak alongside of the car, the light being placed on the running board and capable of an adjustment in or out, to regulate the light streak with respect to the car.

In the accompanying drawings:

Fig. 1 is a side elevation of a car showing the light attached;

Fig. 2 is a front elevation of a car with parts broken away to show the effect of the light when placed in position;

Fig. 3 is an enlarged side view of the running board and light;

Fig. 4 is a transverse sectional view through the running board and light;

Fig. 5 is an enlarged detail sectional view of the light-fastening means.

The numeral 1 indicates the body of the car, and 2—2 the running boards on either side thereof. Mounted for transverse adjustment of the running boards is a metallic casing 3, the base of which is provided with laterally extending members 4—4 received in suitable guide members 5—5 arranged transversely of the running board. Adjusting bolts 6—6 are provided to securely hold the casing in its adjusted position. Supported in the front wall 7 of the casing 3 is the lamp reflector 8 provided with the usual lens 9. Supported within the reflector 8 is a lamp socket 10 in which is mounted the lamp 11. A feed wire 12 leads from the socket 10 to a socket 13 arranged in the side of the car. This lead may be of sufficient length to permit the removal of the casing should it be desirable to use the lamp for emergency. Hinged as at 14 to the upper horizontal edge of the front of the casing is a deflector 15 adapted to direct the rays of the lamp 11 downwardly.

As disclosed in Fig. 2, the deflector 15 limits the rays of the lamp 11 to a horizontal line or in fact to any desirable angle.

In use the casing 3 is adjusted transversely of the running board until the rays of light from the lower side of the lamp strikes the edge of the running board at such an angle as to leave a dark space immediately along the side of the car, then the deflector 15 is adjusted so as to effect a light strip of sufficient width along the side of the car, to insure a safety zone for passing cars, thereby permitting the drivers to cut off their headlights and still have the sides of the roads sufficiently illuminated for safety.

I claim:

1. The combination with a vehicle body having a running-board on either side thereof, guide-ways arranged transversely of said running-board, a light casing adjustably received in said guide-ways, said casing having an inclined outer wall provided with an opening, a light reflector and light received in said opening, and an adjustable deflector pivotally secured along the upper horizontal edge of said casing whereby the light rays are deflected downwardly.

2. The combination with a vehicle body having a running-board on either side thereof, guide-ways arranged transversely of said running-board, a light casing adjustably received in said guide-ways, said casing having an outwardly inclined outer wall provided with an opening, and an adjustable deflector pivotally secured along the upper edge of said casing, the edge of the footboard and deflector serving to confine the rays of the light to effect a dark and light area adjacent the side of the car.

In testimony whereof I affix my signature.

JAMES H. TUDOR.